US012624194B2

(12) United States Patent
Zhang et al.

(10) Patent No.:  US 12,624,194 B2
(45) Date of Patent:       May 12, 2026

(54) AQUEOUS BINDER COMPOSITIONS FOR MINERAL WOOL PRODUCTS

(71) Applicants: Owens Corning Intellectual Capital, LLC, Toledo, OH (US); Paroc Group Oy, Helsinki (FI)

(72) Inventors: Xiujuan Zhang, New Albany, OH (US); Liang Chen, New Albany, OH (US); Charlotte Pettersson, Turku (FI)

(73) Assignees: Owens Corning Intellectual Capital, LLC, Toledo, OH (US); Paroc Group Oy, Helsinki (FI)

( * ) Notice: Subject to any disclaimer, the term of this patent is extended or adjusted under 35 U.S.C. 154(b) by 181 days.

(21) Appl. No.: 17/460,805

(22) Filed: Aug. 30, 2021

(65) Prior Publication Data

US 2022/0064408 A1     Mar. 3, 2022

Related U.S. Application Data

(60) Provisional application No. 63/073,013, filed on Sep. 1, 2020.

(51) Int. Cl.
C08K 7/08          (2006.01)
F16L 59/02         (2006.01)
(52) U.S. Cl.
CPC .............. C08K 7/08 (2013.01); F16L 59/028 (2013.01)
(58) Field of Classification Search
CPC ........ C08J 2333/08; C08J 5/04; C08J 5/0405; C08K 7/08; F16L 59/028; C03C 25/26; C03C 25/323; D04H 1/587; D04H 1/64; D04H 1/645
See application file for complete search history.

(56) References Cited

U.S. PATENT DOCUMENTS

| | | | |
|---|---|---|---|
| 3,920,868 | A | 11/1975 | Hammer |
| 4,613,627 | A | 9/1986 | Sherman et al. |
| 4,777,763 | A | 10/1988 | Shannon et al. |
| 4,794,728 | A | 1/1989 | Tsukada et al. |
| 5,244,695 | A | 9/1993 | Davidowich et al. |
| 5,300,192 | A | 4/1994 | Hansen et al. |

(Continued)

FOREIGN PATENT DOCUMENTS

| | | |
|---|---|---|
| CA | 1228557 A1 | 10/1987 |
| CA | 2301248 A1 | 9/2000 |

(Continued)

OTHER PUBLICATIONS

Lee et al., "A Review on Citric Acid as Green Modifying Agent and Binder for Wood," Polymers, 2020; 12(8):1692, 21 pages.

(Continued)

*Primary Examiner* — Shuangyi Abu Ali
(74) *Attorney, Agent, or Firm* — Calfee, Halter & Griswold LLP

(57)          ABSTRACT

A method of manufacturing an insulation product is provided that includes collecting a plurality of inorganic fibers comprising at least 25 wt. % of bi- and tri-valent metal oxides on a substrate, applying a formaldehyde-free aqueous binder composition that includes a nitrogen-based protective agent to the collection of inorganic fibers, removing the nitrogen-based protective agent by heating the binder-coated inorganic fibers; and curing the aqueous binder composition via an esterification reaction.

11 Claims, 3 Drawing Sheets

(56)                References Cited

U.S. PATENT DOCUMENTS

| | | |
|---|---|---|
| 5,318,990 A | 6/1994 | Strauss |
| 5,342,680 A | 8/1994 | Randall |
| 5,349,041 A | 9/1994 | Blum et al. |
| 5,600,919 A | 2/1997 | Kummermehr et al. |
| 5,644,880 A | 7/1997 | Lehnert et al. |
| 5,660,900 A | 8/1997 | Andersen et al. |
| 5,661,213 A | 8/1997 | Arkens et al. |
| 5,679,145 A | 10/1997 | Andersen et al. |
| 5,763,524 A | 6/1998 | Arkens et al. |
| 5,810,961 A | 9/1998 | Andersen et al. |
| 5,948,833 A | 9/1999 | Jilek et al. |
| 6,030,673 A | 2/2000 | Andersen et al. |
| 6,068,907 A | 5/2000 | Beauregard |
| 6,071,994 A | 6/2000 | Hummerich et al. |
| 6,079,153 A | 6/2000 | Templeton |
| 6,099,773 A | 8/2000 | Reck et al. |
| 6,123,172 A | 9/2000 | Byrd et al. |
| 6,146,746 A | 11/2000 | Reck et al. |
| 6,150,002 A | 11/2000 | Varona |
| 6,221,973 B1 | 4/2001 | Arkens et al. |
| 6,299,936 B1 | 10/2001 | Reck et al. |
| 6,305,495 B1 | 10/2001 | Keegan |
| 6,331,350 B1 | 12/2001 | Taylor et al. |
| 6,443,256 B1 | 9/2002 | Baig |
| 6,511,561 B1 | 1/2003 | Kohlhammer et al. |
| 6,699,945 B1 | 3/2004 | Chen et al. |
| 6,734,237 B1 | 5/2004 | Taylor et al. |
| 6,759,116 B2 | 7/2004 | Edlund |
| 6,774,071 B2 | 8/2004 | Horner et al. |
| 6,780,356 B1 | 8/2004 | Putt et al. |
| 6,803,439 B2 | 10/2004 | Taylor |
| 6,818,694 B2 | 11/2004 | Hindi et al. |
| 6,838,163 B2 | 1/2005 | Smith et al. |
| 6,849,683 B2 | 2/2005 | Husemoen et al. |
| 6,884,838 B2 | 4/2005 | Taylor et al. |
| 6,933,349 B2 | 8/2005 | Chen et al. |
| 6,939,818 B2 | 9/2005 | Drax et al. |
| 6,951,602 B1 | 10/2005 | Reuter et al. |
| 7,026,390 B2 | 4/2006 | O'Brien-Bernini et al. |
| 7,067,579 B2 | 6/2006 | Taylor et al. |
| 7,141,284 B2 | 11/2006 | Newton et al. |
| 7,157,524 B2 | 1/2007 | Chen et al. |
| 7,199,179 B2 | 4/2007 | Clamen et al. |
| 7,300,892 B2 | 11/2007 | Porter |
| 7,338,702 B2 | 3/2008 | Swales et al. |
| 7,351,673 B1 | 4/2008 | Groh et al. |
| 7,377,084 B2 | 5/2008 | Swiszcz et al. |
| 7,459,490 B2 | 12/2008 | Husemoen et al. |
| 7,547,375 B2 | 6/2009 | Jaffee et al. |
| 7,641,764 B2 | 1/2010 | Yoshida et al. |
| 7,803,727 B2 | 9/2010 | Aseere et al. |
| 7,807,592 B2 | 10/2010 | Bland et al. |
| 7,824,762 B2 | 11/2010 | Ziegler |
| 7,829,488 B2 | 11/2010 | Bennett |
| 7,833,638 B2 | 11/2010 | Zheng et al. |
| 7,842,382 B2 | 11/2010 | Helbing |
| 7,893,154 B2 | 2/2011 | Van Herwijnen et al. |
| 7,989,370 B2 | 8/2011 | Currier et al. |
| 8,007,886 B2 | 8/2011 | Tierney et al. |
| 8,017,531 B2 | 9/2011 | Ahluwalia et al. |
| 8,044,168 B2 | 10/2011 | Gudik-Sorensen |
| 8,069,629 B2 | 12/2011 | Rockwell et al. |
| 8,084,379 B2 | 12/2011 | Hogan et al. |
| 8,127,509 B2 | 3/2012 | Propst |
| 8,133,952 B2 | 3/2012 | Pisanova et al. |
| 8,209,904 B2 | 7/2012 | Bouwens et al. |
| 8,211,974 B2 | 7/2012 | Shooshtari et al. |
| 8,283,266 B2 | 10/2012 | Jaffee et al. |
| 8,299,153 B2 | 10/2012 | Kelly |
| 8,329,798 B2 | 12/2012 | Clamen et al. |
| 8,329,817 B2 | 12/2012 | Espiard et al. |
| 8,357,746 B2 | 1/2013 | Shooshtari |
| 8,486,516 B2 | 7/2013 | Hauber et al. |
| 8,552,140 B2 | 10/2013 | Swift |
| 8,603,631 B2 | 12/2013 | Helbing |
| 8,604,122 B2 | 12/2013 | Kelly |
| 8,607,929 B2 | 12/2013 | Bliton et al. |
| 8,623,234 B2 | 1/2014 | Jaffrennou et al. |
| 8,650,913 B2 | 2/2014 | Chacko et al. |
| 8,652,579 B2 | 2/2014 | Shooshtari et al. |
| 8,791,198 B2 | 7/2014 | Miller et al. |
| 8,808,443 B2 | 8/2014 | Jaffrennou |
| 8,815,382 B2 | 8/2014 | Robinson, Jr. |
| 8,864,893 B2 | 10/2014 | Hawkins et al. |
| 8,865,816 B2 | 10/2014 | Zhang |
| 8,974,686 B2 | 3/2015 | Jaffrennou et al. |
| 8,980,774 B2 | 3/2015 | Zhang et al. |
| 9,039,827 B2 | 5/2015 | Hampson |
| 9,172,074 B2 | 10/2015 | Weber et al. |
| 9,174,868 B2 | 11/2015 | Jaffrennou et al. |
| 9,217,065 B2 | 12/2015 | Shoemake et al. |
| 9,238,749 B2 | 1/2016 | Michl et al. |
| 9,290,640 B2 | 3/2016 | Hawkins et al. |
| 9,309,436 B2 | 4/2016 | Swift |
| 9,359,720 B2 | 6/2016 | Chuda et al. |
| 9,376,810 B2 | 6/2016 | Kemp et al. |
| 9,382,404 B2 | 7/2016 | Zhang |
| 9,404,012 B2 | 8/2016 | Connaughton, I et al. |
| 9,453,140 B2 | 9/2016 | Varagnat et al. |
| 9,486,980 B2 | 11/2016 | Hauber et al. |
| PP27,475 P2 | 12/2016 | Kubby |
| 9,550,894 B2 | 1/2017 | Zhang et al. |
| 9,609,813 B2 | 4/2017 | Naerum et al. |
| 9,683,143 B2 | 6/2017 | Negri et al. |
| 9,715,872 B2 | 7/2017 | Guzman et al. |
| 9,777,472 B2 | 10/2017 | Wiker et al. |
| 9,815,928 B2 | 11/2017 | Williamson et al. |
| 9,822,042 B2 | 11/2017 | Rosenthal et al. |
| 9,840,061 B2 | 12/2017 | Jaffee |
| 9,869,089 B2 | 1/2018 | Thomas et al. |
| 9,896,807 B2 | 2/2018 | Englert et al. |
| 9,909,310 B2 | 3/2018 | Frank et al. |
| 9,922,634 B2 | 3/2018 | Thompson, Jr. et al. |
| 10,119,211 B2 | 11/2018 | Obert et al. |
| 10,368,502 B2 | 8/2019 | Letton et al. |
| 11,111,372 B2 | 9/2021 | Zhang et al. |
| 11,136,451 B2 | 10/2021 | Zhang et al. |
| 2003/0008978 A1 | 1/2003 | Chen et al. |
| 2003/0060113 A1 | 3/2003 | Christie et al. |
| 2003/0077546 A1 | 4/2003 | Donovan et al. |
| 2004/0038017 A1 | 2/2004 | Tutin et al. |
| 2004/0209074 A1 | 10/2004 | Randall et al. |
| 2004/0219847 A1 | 11/2004 | Miller |
| 2005/0059770 A1 | 3/2005 | Srinivasan et al. |
| 2005/0215153 A1 | 9/2005 | Cossement et al. |
| 2005/0284065 A1 | 12/2005 | Shaffer |
| 2005/0288424 A1 | 12/2005 | Fisler et al. |
| 2006/0036014 A1 | 2/2006 | Hogan et al. |
| 2006/0078719 A1 | 4/2006 | Miele |
| 2006/0079629 A1 | 4/2006 | Taylor et al. |
| 2006/0101796 A1 | 5/2006 | Kern et al. |
| 2006/0137799 A1 | 6/2006 | Haque et al. |
| 2006/0168881 A1 | 8/2006 | Straumietis |
| 2006/0216489 A1 | 9/2006 | Shooshtari et al. |
| 2006/0217471 A1 | 9/2006 | Shooshtari et al. |
| 2006/0252855 A1 | 11/2006 | Pisanova et al. |
| 2007/0010651 A1 | 1/2007 | Finch et al. |
| 2007/0125011 A1 | 6/2007 | Weir et al. |
| 2007/0270066 A1 | 11/2007 | Van Herwijnen et al. |
| 2007/0292619 A1 | 12/2007 | Srinivasan et al. |
| 2008/0047548 A1 | 2/2008 | Konietzny et al. |
| 2008/0138526 A1 | 6/2008 | Tutin et al. |
| 2008/0152816 A1 | 6/2008 | Clamen et al. |
| 2008/0176050 A1 | 7/2008 | Lintz et al. |
| 2009/0036011 A1 | 2/2009 | Hunig et al. |
| 2009/0156724 A1 | 6/2009 | Espiard et al. |
| 2009/0208714 A1 | 8/2009 | Currier et al. |
| 2010/0016143 A1 | 1/2010 | Shooshtari et al. |
| 2010/0040832 A1 | 2/2010 | Herbert |
| 2010/0064618 A1 | 3/2010 | Boyd |
| 2010/0105272 A1 | 4/2010 | Nandi et al. |
| 2010/0154300 A1 | 6/2010 | Wiersma |
| 2010/0273006 A1 | 10/2010 | Rodrigues et al. |
| 2010/0320113 A1 | 12/2010 | Swift |

(56)  References Cited

U.S. PATENT DOCUMENTS

| | | |
|---|---|---|
| 2011/0003522 A1 | 1/2011 | Chen et al. |
| 2011/0159768 A1 | 6/2011 | Crescimanno et al. |
| 2011/0189478 A1 | 8/2011 | Zhang et al. |
| 2012/0064323 A1 | 3/2012 | Shoemake et al. |
| 2012/0076983 A1 | 3/2012 | Yu et al. |
| 2012/0168054 A1 | 7/2012 | Chen et al. |
| 2012/0245277 A1 | 9/2012 | Michl et al. |
| 2012/0311744 A1 | 12/2012 | Sirkowski |
| 2013/0023174 A1 | 1/2013 | Quinn |
| 2013/0026408 A1 | 1/2013 | Jaffrennou et al. |
| 2013/0032749 A1 | 2/2013 | Jaffrennou et al. |
| 2013/0084445 A1 | 4/2013 | Haley et al. |
| 2013/0157030 A1 | 6/2013 | Frick et al. |
| 2013/0244525 A1 | 9/2013 | Chacko et al. |
| 2013/0334726 A1 | 12/2013 | Hernandez-Torres et al. |
| 2014/0038485 A1 | 2/2014 | Anderson et al. |
| 2014/0083328 A1 | 3/2014 | Lochel, Jr. et al. |
| 2014/0120348 A1 | 5/2014 | Didier et al. |
| 2014/0155353 A1 | 6/2014 | Tezuka et al. |
| 2014/0186635 A1 | 7/2014 | Mueller |
| 2014/0245797 A1 | 9/2014 | Haley et al. |
| 2014/0350142 A1 | 11/2014 | Hansen et al. |
| 2015/0010730 A1 | 1/2015 | Faynot et al. |
| 2015/0027052 A1 | 1/2015 | Janssen et al. |
| 2015/0152244 A1 | 6/2015 | Hernandez-Torres |
| 2015/0373936 A1 | 12/2015 | Bouwens et al. |
| 2016/0088809 A1 | 3/2016 | Lowe et al. |
| 2016/0131299 A1 | 5/2016 | Mueller et al. |
| 2016/0143228 A1 | 5/2016 | De Groot et al. |
| 2016/0145779 A1 | 5/2016 | Teng et al. |
| 2016/0208439 A1 | 7/2016 | Lelogeay |
| 2016/0208483 A1 | 7/2016 | Takeuchi et al. |
| 2016/0219810 A1 | 8/2016 | Erkkila et al. |
| 2016/0264461 A1 | 9/2016 | Peng et al. |
| 2016/0280971 A1 | 9/2016 | Hampson et al. |
| 2016/0319537 A1 | 11/2016 | Rinne et al. |
| 2017/0022398 A1 | 1/2017 | Lochel, Jr. et al. |
| 2017/0037187 A1 | 2/2017 | Appley et al. |
| 2017/0150684 A1 | 6/2017 | Vuorinen et al. |
| 2017/0150687 A1 | 6/2017 | Loiske et al. |
| 2017/0190902 A1 | 7/2017 | Swift |
| 2017/0197379 A1 | 7/2017 | Teng et al. |
| 2017/0198142 A1 | 7/2017 | Hampson et al. |
| 2017/0210952 A1 | 7/2017 | Hampson et al. |
| 2017/0305783 A1 | 10/2017 | Faynot et al. |
| 2017/0332568 A1 | 11/2017 | Storey |
| 2017/0349718 A1 | 12/2017 | Albani et al. |
| 2017/0368792 A1 | 12/2017 | Faotto |
| 2018/0023291 A1 | 1/2018 | Wiker et al. |
| 2018/0031268 A1 | 2/2018 | Lopez Belbeze et al. |
| 2018/0037273 A1 | 2/2018 | Aarts et al. |
| 2018/0116131 A1 | 5/2018 | Leo |
| 2018/0139911 A1 | 5/2018 | Janssen |
| 2018/0312661 A1 | 11/2018 | Hernandez-Torres et al. |
| 2019/0106563 A1* | 4/2019 | Zhang .................... C08L 31/04 |
| 2019/0106564 A1 | 4/2019 | Zhang et al. |
| 2019/0124864 A1 | 5/2019 | Bassin et al. |
| 2019/0151771 A1 | 5/2019 | Thomas |
| 2019/0191641 A1 | 6/2019 | Jackson et al. |
| 2019/0259108 A1 | 8/2019 | Bongartz et al. |
| 2019/0330492 A1 | 10/2019 | Swift et al. |
| 2019/0359521 A1 | 11/2019 | Salomon et al. |
| 2019/0382628 A1 | 12/2019 | Alavi et al. |
| 2020/0095712 A1 | 3/2020 | Mueller et al. |
| 2020/0207972 A1 | 7/2020 | Ong et al. |
| 2020/0270404 A1 | 8/2020 | Funakoshi et al. |
| 2021/0095156 A1 | 4/2021 | Swift et al. |
| 2021/0171757 A1 | 6/2021 | Mueller et al. |
| 2021/0172166 A1 | 6/2021 | Grant et al. |
| 2021/0395508 A1 | 12/2021 | Zhang et al. |
| 2022/0106419 A1 | 4/2022 | Mueller et al. |
| 2022/0106492 A1 | 4/2022 | Click et al. |
| 2022/0162410 A1 | 5/2022 | Mueller et al. |
| 2022/0213628 A1 | 7/2022 | Smith et al. |
| 2023/0348682 A1 | 11/2023 | Zhang et al. |

FOREIGN PATENT DOCUMENTS

| | | | |
|---|---|---|---|
| CA | 2391508 A1 | 5/2001 |
| CA | 2834816 A1 | 11/2012 |
| CA | 2604809 C | 4/2013 |
| CN | 102533168 A | 7/2012 |
| EP | 0194242 B1 | 10/1989 |
| EP | 442811 B2 | 12/1993 |
| EP | 583086 B1 | 11/1997 |
| EP | 1022400 A1 | 7/2000 |
| EP | 0826710 B1 | 9/2001 |
| EP | 715805 B1 | 7/2002 |
| EP | 1522532 A1 | 4/2005 |
| EP | 1038433 B1 | 6/2008 |
| EP | 2071066 A1 | 6/2009 |
| EP | 2093266 A1 | 8/2009 |
| EP | 2324089 A1 | 5/2011 |
| EP | 2268126 B1 | 4/2012 |
| EP | 1303672 B1 | 2/2015 |
| EP | 2690217 B1 | 3/2015 |
| EP | 2855601 B1 | 9/2016 |
| EP | 3034555 B1 | 4/2017 |
| EP | 2197928 A1 | 5/2017 |
| EP | 2694717 A1 | 6/2017 |
| EP | 2844621 B1 | 6/2017 |
| EP | 1656981 B1 | 1/2018 |
| EP | 1800853 B1 | 2/2018 |
| EP | 2755498 B1 | 2/2018 |
| EP | 2324089 B1 | 3/2018 |
| EP | 2231543 B1 | 9/2018 |
| JP | 2013151777 A | 8/2013 |
| JP | 2017106133 A | 6/2017 |
| JP | 2017226826 A | 12/2017 |
| JP | 2018119140 A | 8/2018 |
| WO | 9204824 A1 | 4/1992 |
| WO | 9318642 A1 | 9/1993 |
| WO | 9961384 A1 | 12/1999 |
| WO | 2004076734 A1 | 9/2004 |
| WO | 2004098270 A1 | 11/2004 |
| WO | 2006136389 A1 | 12/2006 |
| WO | 2007149644 A1 | 12/2007 |
| WO | 2008009460 A1 | 1/2008 |
| WO | 2008009462 A1 | 1/2008 |
| WO | 2008009465 A1 | 1/2008 |
| WO | 2009080822 A1 | 7/2009 |
| WO | 2011044490 A1 | 4/2011 |
| WO | 2012118939 A1 | 9/2012 |
| WO | 2013021234 A1 | 2/2013 |
| WO | 2015144843 A1 | 10/2015 |
| WO | 2016025987 A2 | 2/2016 |
| WO | 2017074853 A1 | 5/2017 |
| WO | 2017084853 A1 | 5/2017 |
| WO | 2017157525 A1 | 9/2017 |
| WO | 2018010558 A1 | 1/2018 |
| WO | 2018158677 A1 | 9/2018 |
| WO | 2019074867 A1 | 4/2019 |
| WO | 2020144436 A1 | 7/2020 |
| WO | 2021118951 A1 | 6/2021 |

OTHER PUBLICATIONS

International Search Report and Written Opinion from PCT/US2021/048189 dated Dec. 17, 2021.

Wikipedia, "Triose," retrieved from <https://en.wikipedia.org/wiki/Triose> on Oct. 29, 2021.

Office Action from CN Application No. 202180053395.X dated Mar. 18, 2025.

Office Action from CN Application No. 202180053395.X dated Oct. 18, 2024.

Partial Supplementary European Search Report from EP Application No. 21864946.5 dated Sep. 26, 2024.

Extended European Search Report from EP Application No. 21864946.5 dated Dec. 17, 2024.

* cited by examiner

AQUEOUS BINDER COMPOSITIONS FOR MINERAL WOOL PRODUCTS

CROSS-REFERENCE TO RELATED APPLICATION(S)

This application claims priority to and any benefit of U.S. Provisional Application No. 63/073,013, filed Sep. 1, 2020, the content of which is incorporated herein by reference in its entirety.

BACKGROUND

Aqueous binder compositions are conventionally utilized in the formation of woven and non-woven fibrous products, such as insulation products, composite products, wood fiber board, and the like. Insulation products, for example insulation products formed of inorganic fibers, are typically manufactured by fiberizing a molten glass or mineral-based composition and spinning fibers from a fiberizing apparatus, such as a rotating spinner. To form an insulation product, fibers produced by a rotating spinner are drawn downwardly from the spinner towards a conveyor by a blower. As the fibers move downward, a binder material is sprayed onto the fibers and the fibers are collected into a high loft, continuous blanket on the conveyor. The binder material gives the insulation product resiliency for recovery after packaging and provides stiffness and handleability so that the insulation product can be handled and applied as needed in the insulation cavities of buildings. The binder composition also provides protection to the fibers from interfilamentous abrasion and promotes compatibility between the individual fibers. The blanket containing the binder-coated fibers is then passed through a curing oven and the binder is cured to set the blanket to a desired thickness.

After the binder has cured, the fiber insulation may be cut into lengths to form individual insulation products, and the insulation products may be packaged for shipping to customer locations. Insulation products prepared in this manner can be provided in various forms including batts, blankets, and boards (heated and compressed batts) for use in different applications.

Mineral fiber products generally comprise man-made vitreous fibers (MMVF), such as, for example, glass fibers, ceramic fibers, basalt fibers, slag wool, mineral wool, and stone wool, which are bound together by a polymeric binder composition. Traditional binder compositions used for mineral fiber insulation, and particularly particular mineral wool insulation, are based on phenol-formaldehyde (PF) resins, as well as PF resins extended with urea (PUF resins). However, while such binder compositions provide suitable properties to the insulation products, formaldehyde binders emit undesirable emissions during the manufacturing process and there has been a desire to move away from the use of formaldehyde-based binders.

As an alternative to formaldehyde-based binders, certain formaldehyde-free formulations have been developed for use as a binder in insulation products. Such formaldehyde-free formulations may include a polycarboxylic acid with a polyhydroxy component that are intended to crosslink via an esterification reaction. Such polycarboxylic acid-based binder compositions are often acidic in nature, with a pH less than 5. Mineral wool fibers, however, are highly alkaline, with a higher concentration of bi- and tri-valent metal oxides in the fibers than other inorganic fibers, such as fiberglass. Thus, polycarboxylic acid groups in the traditional binder compositions irreversibly react with the metal oxides of the mineral wool fibers upon application, which blocks the acid groups from being available for an esterification reaction with the polyhydroxy crosslinking agents. Accordingly, acidic binders tend to lack the strength of PF binder when used with mineral wool and products formed therefrom demonstrate insufficient performance.

Accordingly, there is a need for a formaldehyde-free binder composition for use in the production of high alkalinity fibrous insulation products, such as mineral wool.

SUMMARY

Various exemplary aspects of the inventive concepts are directed to a method of manufacturing an insulation product comprising collecting a plurality of inorganic fibers on a substrate, the inorganic fibers being formed of a composition comprising at least 25 wt. % of bi- and tri-valent metal oxides; applying an aqueous binder composition to the collection of inorganic fibers; and forming binder-coated inorganic fibers. The aqueous binder composition comprises at least 50 wt. % solids of a crosslinking agent comprising at least two carboxylic acid groups; 10.0 to 40.0 wt. % solids of a polyol component having at least two hydroxyl groups; and 1.25-50.0 wt. % solids of a nitrogen-based protective agent. The nitrogen-based protective agent temporarily blocks at least 40% the carboxylic acid groups of the crosslinking agent. The method further includes removing the nitrogen-based protective agent by heating the binder-coated inorganic fibers to a temperature of at least 150° C.; and curing the aqueous binder composition via an esterification reaction between the crosslinking agent and the polyol component, forming an inorganic fibrous insulation product, wherein said aqueous binder composition is free of added formaldehyde.

In any of the exemplary embodiments, the crosslinking agent is present in the binder composition in an amount between 55 wt. % and 85 wt. % solids, based on the total solids content of the aqueous binder composition.

In any of the exemplary embodiments, the polyol component comprises a sugar alcohol, an alkanolamine, pentaerythritol, or mixtures thereof.

The nitrogen-based protective agent may comprise ethylenediamine, ammonium hydroxide, or mixtures thereof.

In any of the exemplary embodiments, the aqueous binder composition has an uncured pH of 4.0 to 7.0. such as 4.2 to 6.5, and 4.3 and 6.3.

In any of the exemplary embodiments, the insulation product has a tensile strength in the machine direction according to EN1607 of at least 30 kPa immediately upon manufacture.

In any of the exemplary embodiments, the insulation product may maintain at least 50% of the tensile strength after 7 days in a tropic box with a temperature of 65° C. and 95% relative humidity, and in any of the exemplary embodiments, the insulation product may maintain at least 60% of the tensile strength after 7 days in a tropic box with a temperature of 65° C. and 95% relative humidity.

In any of the exemplary embodiments, the insulation product has a compressive strength at 10% strain according to EN826 of at least 10 kPa.

Further exemplary aspects of the present inventive concepts are directed to fibrous product comprising a plurality of randomly oriented mineral wool fibers; and an ester-crosslinked thermoset binder composition at least partially coating the fibers. Prior to crosslinking, the binder composition is comprised of an aqueous composition including the following components: at least 50 wt. % solids of a crosslinking agent comprising at least two carboxylic acid groups; 10.0 to 40.0 wt. % solids of at least one polyol having at least two hydroxyl groups, based on the total solids content of the aqueous binder composition; and 1.25 to 50.0 wt. % solids of a nitrogen-based protective agent. Prior to crosslinking, the nitrogen-based protective agent temporarily blocks at least 40% the carboxylic acid groups of the crosslinking agent. The mineral wool insulation product has a tensile strength in the machine direction according to EN1607 of at least 30 kPa immediately upon manufacture and maintains at least 50% of the tensile strength after 7 days under hot/humid conditions, and in any of the exemplary embodiments, at least 60% of the tensile strength after 7 days in a tropic box with a temperature of 65° C. and 95% relative humidity.

In any of the exemplary embodiments, the fibrous product comprises any of an insulation product, a non-woven mat, particle board, ceiling board, and duct board.

The crosslinking agent may be present in the binder composition in an amount between 60 and 82 wt. %, based on the total solids content of the aqueous composition.

The polyol component comprises a sugar alcohol, an alkanolamine, pentaerythritol, or mixtures thereof. In any of the exemplary embodiments the polyol component comprises sorbitol, triethanolamine, pentaerythritol, or mixtures thereof.

In any of the exemplary embodiments, the fibrous product has a compressive strength at 10% strain according to EN826 of at least 10 kPa.

Yet further exemplary aspects of the present inventive concepts are directed to an aqueous binder composition comprising at least 50 wt. % solids of a polymeric crosslinking agent comprising at least two carboxylic acid groups; at least 8.0 wt. % solids of a protective agent comprising one or more amine groups; and 10.0 to 35.0 wt. % solids of at least one polyol component having at least two hydroxyl groups. The binder composition has a ratio of crosslinking agent to nitrogen-based protective agent from 4:1 to 1.5:1 and an uncured pH of at least 4.5. Prior to curing the binder composition, at least 40% of the carboxylic acid groups are temporarily blocked with the nitrogen-based protective agent.

The crosslinking agent may be present in the aqueous binder composition in an amount between 60 and 82 wt. %, based on the total solids content of the aqueous binder composition.

The polyol component may comprise one or more of a sugar alcohol, an alkanolamine, pentaerythritol, or mixtures thereof. In any of the exemplary embodiments, the polyol component comprises sorbitol, triethanolamine, pentaerythritol, or mixtures thereof.

Numerous other aspects, advantages, and/or features of the general inventive concepts will become more readily apparent from the following detailed description of exemplary embodiments and from the accompanying drawings being submitted herewith.

BRIEF DESCRIPTION OF THE DRAWINGS

The general inventive concepts, as well as illustrative embodiments and advantages thereof, are described below in greater detail, by way of example, with reference to the drawings in which.

DETAILED DESCRIPTION

Figure 1:
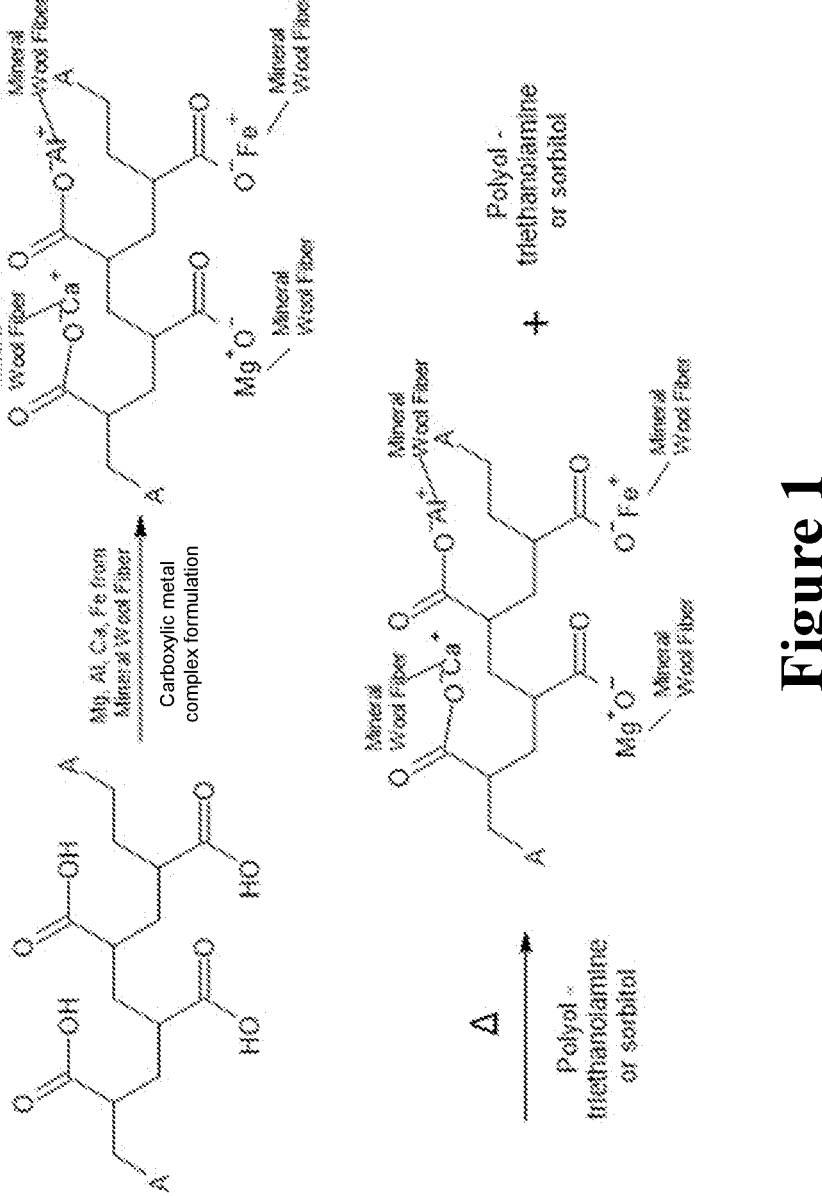
FIG. 1 illustrates an exemplary esterification reaction under limited crosslinking due to the formation of carboxylic metal complexes between mineral wool fibers and unprotected carboxylic acid.

Unless otherwise defined, all technical and scientific terms used herein have the same meaning as commonly understood by one of ordinary skill in the art to which these exemplary embodiments belong. The terminology used in the description herein is for describing exemplary embodiments only and is not intended to be limiting of the exemplary embodiments. Accordingly, the general inventive concepts are not intended to be limited to the specific embodiments illustrated herein. Although other methods and materials similar or equivalent to those described herein can be used in the practice or testing of the present invention, the preferred methods and materials are described herein.

As used in the specification and the appended claims, the singular forms "a," "an," and "the" are intended to include the plural forms as well, unless the context clearly indicates otherwise.

By "substantially free" it is meant that a composition includes less than 1.0 wt. % of the recited component, including no greater than 0.8 wt. %, no greater than 0.6 wt. %, no greater than 0.4 wt. %, no greater than 0.2 wt. %, no greater than 0.1 wt. %, and no greater than 0.05 wt. %. In any of the exemplary embodiments, "substantially free" means that a composition includes no greater than 0.01 wt. % of the recited component.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least, each numerical parameter should be construed in light of the number of significant digits and ordinary rounding approaches.

Unless otherwise indicated, any element, property, feature, or combination of elements, properties, and features, may be used in any embodiment disclosed herein, regardless of whether the element, property, feature, or combination of elements, properties, and features was explicitly disclosed in the embodiment. It will be readily understood that features described in relation to any particular aspect described herein may be applicable to other aspects described herein provided the features are compatible with that aspect. In particular: features described herein in relation to the method may be applicable to the fibrous product and vice versa; features described herein in relation to the method may be applicable to the aqueous binder composition and vice versa; and features described herein in relation to the fibrous product may be applicable to the aqueous binder composition and vice versa.

Every numerical range given throughout this specification and claims will include every narrower numerical range that falls within such broader numerical range, as if such narrower numerical ranges were all expressly written herein.

The present disclosure relates to formaldehyde-free or "no added formaldehyde" aqueous binder compositions for use with inorganic fibers, such as glass or mineral wool fibers. As used herein, the terms "binder composition," "aqueous binder composition," "binder formulation," "binder," and "binder system' may be used interchangeably and are synonymous.

The binder composition may be used in the manufacture of fiber insulation products and related products, such as fiber-reinforced mats, veils, nonwovens, etc. (all hereinafter referred to generically as fibrous products). The binder composition may particularly be used with rock or mineral wool products, such as mineral wool insulation products, made with the cured binder composition. Other products may include composite products, wood fiber board products, metal building insulation, pipe insulation, ceiling board, ceiling tile, "heavy density" products, such as ceiling board, duct wrap, duct liners, and also "light density" products. Further fibrous products include non-woven fiber mats and particle boards, and composite products manufactured therefrom.

The present inventive concepts are based on the discovery that by temporarily blocking a percentage of the carboxylic acid functional groups, acidic binder compositions can be applied to mineral wool fibers without damaging the fibers or impacting the ability of the binder composition to effectively crosslink via esterification to form an effective ester-crosslinked thermoset binder composition with no added formaldehyde.

Suitable fibers for use in the fibrous products of the present disclosure include, but are not limited to, mineral fibers (e.g., mineral wool, rock wool, stone wool, slag wool, and the like), glass fibers, carbon fibers, ceramic fibers, natural fibers, and synthetic fibers. In certain exemplary embodiments, the plurality of randomly oriented fibers are mineral wool fibers, including, but not limited to mineral wool fibers, rock wool fibers, slag wool fibers, stone wool fibers, or combinations thereof.

The fibrous insulation products may be formed entirely of one type of fiber, or they may be formed of a combination of two or more types of fibers. For example, the insulation products may be formed of combinations of various types of mineral fibers or various combinations of different inorganic fibers and/or natural fibers depending on the desired application. In certain exemplary embodiments the insulation products are formed entirely of mineral wool fibers.

Compared to glass fibers used for insulation, mineral wool generally has a higher percentage of bi- and tri-valent metal oxides. Table 1 provides the typical glass wool formulation ranges and typical stone (or mineral) wool formulation ranges. Guldberg, Marianne, et al. "The Development of Glass and Stone Wool Compositions with Increased Biosolubility" *Regulatory Toxicology and Pharmacology* 32, 184-189 (2000). As shown below, glass wool has a total weight percentage of bi- and tri-valent oxides (CaO/MgO/Al$_2$O$_3$/FeO) that is no greater than 25 wt. %. In contrast, mineral or stone wool comprise a minimum of 25 wt. % bi- and tri-valent metal oxides, or, in some instances, greater than 30 wt. % bi- and tri-valent metal oxides, and in some instances at least 50 wt. % bi- and tri-valent metal oxides. Such metal oxides, particularly aluminum, have a strong tendency to complex with acidic functionalities, such as carboxylic acids, which inhibits binder wetting on the fibers and prevents sufficient esterification and crosslinking. Accordingly, traditional acidic formaldehyde-free binders show decreased performance with mineral wool fibers.

TABLE 1

| Traditional Insulation Wool Compositions (in Weight %) | | |
| --- | --- | --- |
| | Glass wool traditional: Typical ranges | Stone wool traditional: Typical ranges |
| SiO$_2$ | 60-70 | 43-50 |
| Al$_2$O$_3$ | 3-7 | 6-15 |
| TiO$_2$ | <0.1 | 0.5-3.5 |
| FeO | <0.5 | 3-8 |
| CaO | 5-13 | 10-25 |
| MgO | 0-5 | 6-16 |
| Na$_2$O | 13-18 | 1-3.5 |
| K$_2$O | 0-2.5 | 0.5-2 |
| B$_2$O$_3$ | 3-7 | <1 |
| P$_2$O$_3$ | <0.1 | <1 |

The subject binder composition includes an acidic crosslinking agent suitable for crosslinking with a polyol component via an esterification reaction. In any of the exemplary embodiments, the crosslinking agent may have a number-average molecular weight greater than 90 Daltons, such as from about 90 Daltons to about 10,000 Daltons, or from about 190 Daltons to about 5,000 Daltons. In any of the exemplary embodiments, the crosslinking agent has a number-average molecular weight of about 2,000 Daltons to 5,000 Daltons, or about 4,000 Daltons.

Non-limiting examples of suitable crosslinking agents include materials having one or more carboxylic acid groups (—COOH), such as monomeric and polymeric polycarboxylic acids, including salts or anhydrides thereof, and mixtures thereof. In any of the exemplary embodiments, the polycarboxylic acid may be a polymeric polycarboxylic acid, such as a homopolymer or copolymer of acrylic acid. The polymeric polycarboxylic acid may comprise polyacrylic acid (including salts or anhydrides thereof) and polyacrylic acid-based resins such as QR-1629S and Acumer 9932, both commercially available from The Dow Chemical Company, polyacrylic acid compositions commercially from CH Polymer, and polyacrylic acid compositions commercially available from Coatex. Acumer 9932 is a polyacrylic acid/sodium hypophosphite resin having a molecular weight of about 4000 and a sodium hypophosphite content of 6-7% by weight, based on the total weight of the polyacrylic acid/sodium hypophosphite resin. QR-1629S is a polyacrylic acid/glycerin resin composition.

In any of the exemplary embodiments disclosed herein, the crosslinking agent may be present in the binder composition in at least 50 wt. %, based on the total solids content of the binder composition, including, without limitation at least 55 wt. %, at least 60 wt. %, at least 63 wt. %, at least 65 wt. %, at least 68 wt. %, at least 70 wt. %, at least 71 wt. %, at least 73 wt. %, and at least 75.0 wt. %. In any of the exemplary embodiments, the crosslinking agent may be present in the binder composition in an amount from 50% to 85% by weight, based on the total solids content of the binder composition, including without limitation 60% to 82% by weight, 65% to 80% by weight, and 68% to 78% by weight, including all endpoints and sub-combinations therebetween.

It has surprisingly been discovered that all or a percentage of the acid functionality in the polycarboxylic acid may be temporarily blocked with the use of a protective agent, which temporarily blocks the acid functionality from complexing with the mineral wool fibers, and is subsequently removed by heating the binder composition to a temperature of at least 150° C., freeing the acid functionalities to crosslink with the polyol component and complete the esterification process, during the curing process. In any of the exemplary embodiments, 10% to 100% of the carboxylic acid functional groups may be temporarily blocked by the protective agent, including between about 25% to about 99%, about 30% to about 90%, and about 40% to 85%, including all subranges and combinations of ranges therebetween. In any of the exemplary embodiments, a minimum of 40% of the acid functional groups may be temporarily blocked by the protective agent.

The protective agent may be capable of reversibly bonding to the carboxylic acid groups of the crosslinking agent. In any of the exemplary embodiments, the protective agent comprises any compound comprising molecules capable of forming at least one reversible ionic bond with a single acid functional group. In any of the exemplary embodiments disclosed herein, the protective agent may comprise a nitrogen-based protective agent, such as an ammonium-based protective agent; an amine-based protective agent; or mixtures thereof. An exemplary ammonium based protective agent includes ammonium hydroxide. Exemplary amine-based protective agents include alkylamines and diamines, such as, for example ethyleneimine, ethylenediamine, hexamethylenediamine; alkanolamines, such as: ethanolamine, diethanolamine, triethanolamine; ethylenediamine-N,N'-disuccinic acid (EDDS), and the like, or mixtures thereof. In addition, it has been surprisingly discovered that the alkanolamine can be used as both a protecting agent and as a participant in the crosslinking reaction to form ester in the cured binder. Thus, the alkanolamine has a dual-functionality of protective agent and polyol for crosslinking with the polycarboxylic acid via esterification.

Figure 2:
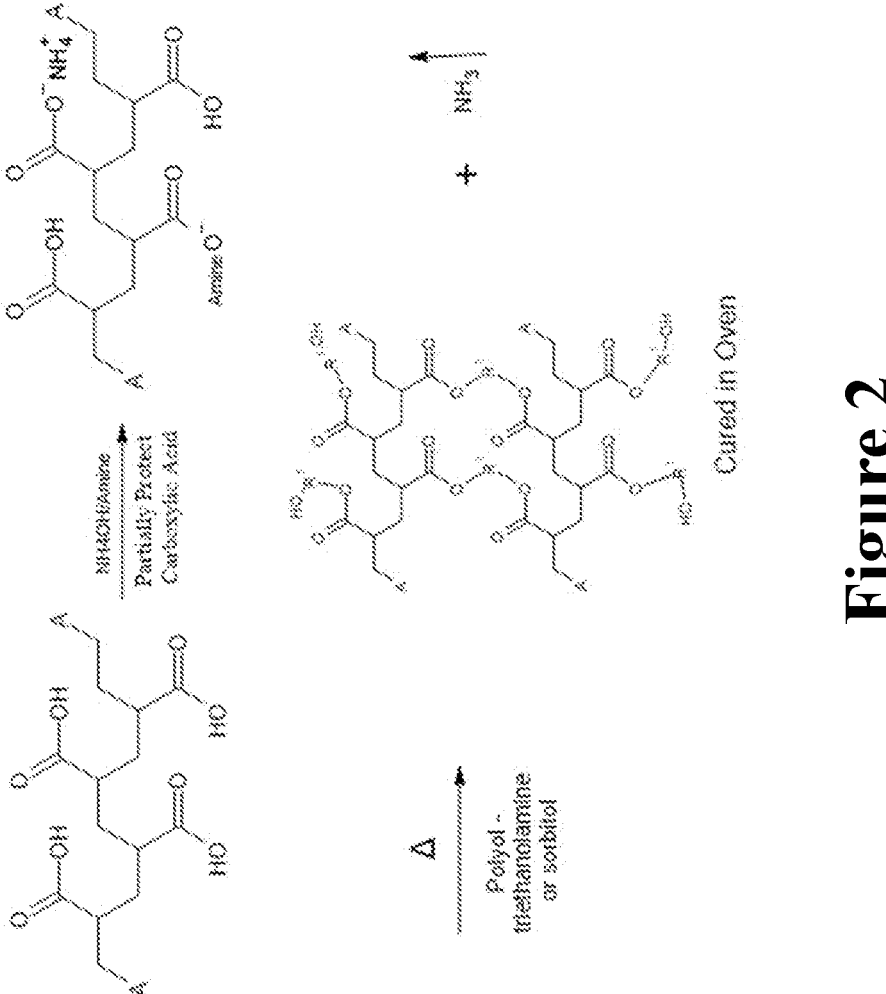
FIG. 2 illustrates an exemplary esterification reaction with a partially protected carboxylic acid-based binder.

As illustrated in FIG. 1, if left unprotected, the carboxylic acid groups in the polycarboxylic acid component will form a carboxylic-metal complex with the metal ions ($Mg^{2+}$, $Al^{3+}$, $Ca^{2+}$, $Fe^{3+}$, $Fe^{2+}$) from the mineral wool fibers. Under such circumstances, as the binder composition is cured, the polyol will have very limited availability to crosslink with the carboxylic acid groups, leading to weak binder performance. In contrast, FIG. 2 illustrates the pre-reaction of the polycarboxylic acid with a nitrogen-based protective agent, such as ammonium hydroxide or an amine. Such a pre-reaction temporarily blocks the acid functional groups from permanently reacting with the metal ions. As the binder is cured, ammonia is released, freeing the acid functional groups to react with the polyol via esterification.

Surprisingly, the protective agent functions differently than a conventional pH adjuster. A protective agent, as defined herein, only temporarily and reversibly blocks the acid functional groups in the polymeric polycarboxylic acid component. In contrast, conventional pH adjusters, such as sodium hydroxide, permanently terminate an acid functional group, which prevents crosslinking between the acid and hydroxyl groups due to the blocked acid functional groups. Thus, the inclusion of traditional pH adjusters, such as sodium hydroxide, does not provide the desired effect of temporarily blocking the acid functional groups, while later freeing up those functional groups during to cure to permit crosslinking via esterification. Accordingly, in any of the exemplary embodiments disclosed herein, the binder composition may be free or substantially free of conventional pH adjusters, such as, for example, sodium hydroxide and potassium hydroxide. Such conventional pH adjusters for high temperature applications will permanently bond with the carboxylic acid groups and will not release the carboxylic acid functionality to allow for crosslinking esterification.

Moreover, along with providing a temporary blocking function, the protective agent also increases the pH of the binder composition to provide compatibility with the pH of the mineral wool fiber. If the pH of the binder composition is significantly lower than the pH of the fiber, the binder composition can damage the mineral fiber, which changes the composition and weakens the fiber. The function of the binder composition is to adhere the fibers together and should not react with the fiber itself.

The pH of the binder composition in an un-cured state may be adjusted depending on the intended application, to facilitate the compatibility of the ingredients of the binder composition, or to function with various types of fibers. In any of the exemplary embodiments disclosed herein, when in an un-cured state, the pH of the binder composition has a pH of at least about 4. In such exemplary embodiments, the pH of the binder composition, when in an un-cured state, may be about 4.0-7.0, including about 4.2-6.8, and about 4.5-6.5. After cure, the pH of the binder composition may rise to at least a pH of 6.5 and up to pH of 8.5. In any of the exemplary embodiments disclosed herein, the cured pH of the binder composition is between 7.2 and 7.8.

The protective agent may be present in the binder composition in an amount from 1.25 wt. % to 50.0 wt. %, based on the total solids in the binder composition, including without limitation, amounts from 2.50 wt. % to 25.0 wt. %, or from 3.0 wt. % to 15.5 wt. %. In any of the exemplary embodiments disclosed herein, the protective agent is present in the binder composition in at least 3.5 wt. %, including at least 4.0 wt. %, at least 5.0 wt. %, at least 6.0 wt. %, and at least 8.0 wt. %. In any of the exemplary embodiments, the protective agent may be used in an amount sufficient to block at least 40% of the acid functional groups of the polycarboxylic acid.

In any of the exemplary embodiments, the binder composition includes a ratio of carboxylic acid groups to amine groups ranges from about 6:1 to about 1:1, or from about 4:1 to about 1.5:1.

In any of the exemplary embodiments, the binder composition further includes at least one polyol having two or more hydroxyl groups (also referred to herein as a polyhydroxy compound). In any of the exemplary embodiments, the polyol comprises one or more of monomeric or polymeric polyhydroxy compounds.

Exemplary polyols include pentaerythritol, alkanolamines, mixtures thereof, or derivatives thereof. In any of the exemplary embodiments, the alkanolamine may comprise triethanolamine, or derivatives thereof. Accordingly, in some exemplary embodiments, the polyol comprises one or more of pentaerythritol, triethanolamine, derivatives thereof, or mixtures thereof.

In other exemplary embodiments, the polyol may comprise one or more sugar alcohols. Sugar alcohol is understood to mean compounds obtained when the aldo or keto groups of a sugar are reduced (e.g. by hydrogenation) to the corresponding hydroxy groups. The starting sugar might be chosen from monosaccharides, oligosaccharides, and polysaccharides, and mixtures of those products, such as syrups, molasses and starch hydrolyzates. The starting sugar also could be a dehydrated form of a sugar. Although sugar alcohols closely resemble the corresponding starting sugars, they are not sugars. Thus, for instance, sugar alcohols have no reducing ability, and cannot participate in the Maillard reaction typical of reducing sugars. In any of the exemplary embodiments, the sugar alcohol includes any of glycerol, erythritol, arabitol, xylitol, sorbitol, maltitol, mannitol, iditol, isomaltitol, lactitol, cellobitol, palatinitol, maltotritol, syrups thereof, and mixtures thereof. In various exemplary embodiments, the sugar alcohol is selected from glycerol, sorbitol, xylitol, and mixtures thereof. In any of the exemplary embodiments, the polyol may be a dimeric or oligomeric condensation product of a sugar alcohol. In any of the exemplary embodiments, the condensation product of a sugar alcohol may be isosorbide. In any of the exemplary embodiments, the sugar alcohol may be a diol or glycol.

In any of the exemplary embodiments, the binder composition may be free of reducing sugars. A reducing sugar is a type of carbohydrate or sugar that includes a free aldehyde or ketone group and can donate electrons to another molecule. As the binder composition is free of reducing sugars, it is unable to participate in a Maillard reaction, which is a process that occurs when a reducing sugar reacts with an amine. The Maillard reaction results in a binder composition with a brown color, which is undesirable for the subject binder composition.

In any of the exemplary embodiments, the polyol may include at least one carbohydrate that is natural in origin and derived from renewable resources. For instance, the carbohydrate may be derived from plant sources such as legumes, maize, corn, waxy corn, sugar cane, milo, white milo, potatoes, sweet potatoes, tapioca, rice, waxy rice, peas, sago, wheat, oat, barley, rye, amaranth, and/or cassava, as well as other plants that have a high starch content. The carbohydrate may also be derived from crude starch-containing products derived from plants that contain residues of proteins, polypeptides, lipids, and low molecular weight carbohydrates. The carbohydrate may be selected from monosaccharides (e.g., xylose, glucose, and fructose), disaccharides (e.g., sucrose, maltose, and lactose), oligosaccharides (e.g., glucose syrup and fructose syrup), and polysaccharides and water-soluble polysaccharides (e.g., pectin, dextrin, maltodextrin, starch, modified starch, and mixtures thereof).

The carbohydrate may be a carbohydrate polymer having a number average molecular weight from about 1,000 to about 8,000. Additionally, the carbohydrate polymer may have a dextrose equivalent (DE) number from 2 to 20, from 7 to 11, or from 9 to 14. In at least one exemplary embodiment, the carbohydrate is a water-soluble polysaccharide such as dextrin or maltodextrin.

The polyol may be present in the binder composition in an amount up to about 50% by weight total solids, including without limitation, up to about 40%, about 35%, about 30%, about 28%, and about 25% by weight total solids. In any of the exemplary embodiments, the polyol may be present in the binder composition in an amount from 5.0% to about 50% by weight total solids, including without limitation 10% to 45%, 15% to 40%, 18% to 38%, 20% to 35%, 22% to 32%, 20% to 50%, and 17% to 27%, by weight total solids, including all endpoints and sub-combinations therebetween. In any of the exemplary embodiments, the polyol may be present in an amount to provide a ratio of carboxylic acid groups to hydroxyl groups from 10:1 to 0.2:1, or from 3:1 to 0.5:1.

Optionally, the binder composition may include an esterification catalyst, also known as a cure accelerator. The catalyst may include inorganic salts, Lewis acids (i.e., aluminum chloride or boron trifluoride), Bronsted acids (i.e., sulfuric acid, p-toluenesulfonic acid and boric acid) organometallic complexes (i.e., lithium carboxylates, sodium carboxylates), and/or Lewis bases (i.e., polyethyleneimine, diethylamine, or triethylamine). Additionally, the catalyst may include an alkali metal salt of a phosphorous-containing organic acid; in particular, alkali metal salts of phosphorus acid, hypophosphorus acid, or polyphosphoric. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexametaphosphate, potassium phosphate, potassium tripolyphosphate, sodium trimetaphosphate, sodium tetrametaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also or alternatively be used as the catalyst.

The catalyst may be present in the binder composition in an amount from about 0% to about 10% by weight of the total solids in the binder composition, including without limitation, amounts from about 0 to about 5% by weight, or from about 0.5% to about 4.5% by weight, or from about 1.0% to about 4.0% by weight, or from about 1.15% to about 3.8% by weight.

Optionally, the binder composition may contain at least one coupling agent. In at least one exemplary embodiment, the coupling agent is a silane coupling agent. The coupling agent(s) may be present in the binder composition in an amount from about 0.01% to about 5% by weight of the total solids in the binder composition, from about 0.01% to about 2.5% by weight, from about 0.05% to about 1.5% by weight, or from about 0.1% to about 1.0% by weight.

Non-limiting examples of silane coupling agents that may be used in the binder composition may be characterized by the functional groups alkyl, aryl, amino, epoxy, vinyl, methacryloxy, ureido, isocyanato, and mercapto. In exemplary embodiments, the silane coupling agent(s) include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., triethoxyaminopropylsilane; 3-aminopropyltriethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In one or more exemplary embodiment, the silane is an aminosilane, such as γ-aminopropyltriethoxysilane.

Optionally, the binder composition may include one or more processing aids. The processing aid is not particularly limiting so long as the process aid functions to facilitate the processing of the fibers formation and orientation. The process aid can be used to improve binder application distribution uniformity, to reduce binder viscosity, to increase ramp height after forming, to improve the vertical weight distribution uniformity, and/or to accelerate binder de-watering in both forming and oven curing process. The process aid may be present in the binder composition in an amount from 0 to about 15% by weight, from about 0.1% to about 10.0% by weight, or from about 0.3% to about 5.0% by weight, or from about 0.5% to 2.0% by weight, based on the total solids content in the binder composition. In any of the exemplary embodiments, the aqueous binder composition may be substantially or completely free of any processing aids.

Examples of processing aids include defoaming agents, such as, emulsions and/or dispersions of mineral, paraffin, or vegetable oils; silicone, dispersions of polydimethylsiloxane (PDMS) fluids, and silica which has been hydrophobized with polydimethylsiloxane or other materials. Further processing aids may include particles made of amide waxes such as ethylenebis-stearamide (EBS) or hydrophobized silica.

Further processing aids may comprise viscosity modifiers including, for example, glycerol, 1,2,4-butanetriol, 1,4-butanediol, 1,2-propanediol, 1,3-propanediol, poly(ethylene glycol), and combinations thereof.

A further process aid that may be utilized in the binder composition is a surfactant. One or more surfactants may be included in the binder composition to assist in binder atomization, wetting, and interfacial adhesion.

The surfactant is not particularly limited, and includes surfactants such as, but not limited to, ionic surfactants (e.g., sulfate, sulfonate, phosphate, and carboxylate); sulfates (e.g., alkyl sulfates, ammonium lauryl sulfate, sodium lauryl sulfate (SDS), alkyl ether sulfates, sodium laureth sulfate, and sodium myreth sulfate); amphoteric surfactants (e.g., alkylbetaines such as lauryl-betaine); sulfonates (e.g., dioctyl sodium sulfosuccinate, perfluorooctanesulfonate, perfluorobutanesulfonate, and alkyl benzene sulfonates); phosphates (e.g., alkyl aryl ether phosphate and alkyl ether phosphate); carboxylates (e.g., alkyl carboxylates, fatty acid salts (soaps), sodium stearate, sodium lauroyl sarcosinate, carboxylate fluorosurfactants, perfluoronanoate, and perfluorooctanoate); cationic (e.g., alkylamine salts such as laurylamine acetate); pH dependent surfactants (primary, secondary or tertiary amines); permanently charged quaternary ammonium cations (e.g., alkyltrimethylammonium salts, cetyl trimethylammonium bromide, cetyl trimethylammonium chloride, cetylpyridinium chloride, and benzethonium chloride); and zwitterionic surfactants, quaternary ammonium salts (e.g., lauryl trimethyl ammonium chloride and alkyl benzyl dimethylammonium chloride), polyoxyethylenealkylamines, and mixtures thereof.

Suitable nonionic surfactants that can be used in conjunction with the binder composition include polyethers (e.g., ethylene oxide and propylene oxide condensates, which include straight and branched chain alkyl and alkaryl polyethylene glycol and polypropylene glycol ethers and thioethers); alkylphenoxypoly(ethyleneoxy) ethanols having alkyl groups containing from about 7 to about 18 carbon atoms and having from about 4 to about 240 ethyleneoxy units (e.g., heptylphenoxypoly(ethyleneoxy) ethanols, and nonylphenoxypoly(ethyleneoxy) ethanols); polyoxyalkylene derivatives of hexitol including sorbitans, sorbides, mannitans, and mannides; partial long-chain fatty acids esters (e.g., polyoxyalkylene derivatives of sorbitan monolaurate, sorbitan monopalmitate, sorbitan monostearate, sorbitan tristearate, sorbitan monooleate, and sorbitan trioleate); condensates of ethylene oxide with a hydrophobic base, the base being formed by condensing propylene oxide with propylene glycol; sulfur containing condensates (e.g., those condensates prepared by condensing ethylene oxide with higher alkyl mercaptans, such as nonyl, dodecyl, or tetradecyl mercaptan, or with alkylthiophenols where the alkyl group contains from about 6 to about 15 carbon atoms); ethylene oxide derivatives of long-chain carboxylic acids (e.g., lauric, myristic, palmitic, and oleic acids, such as tall oil fatty acids); ethylene oxide derivatives of long-chain alcohols (e.g., octyl, decyl, lauryl, or cetyl alcohols); and ethylene oxide/propylene oxide copolymers.

In any of the exemplary embodiments, the surfactants may include one or more of Dynol 607, which is a 2,5,8, 11-tetramethyl-6-dodecyne-5,8-diol, SURFONYL® 420, SURFONYL® 440, and SURFONYL® 465, which are ethoxylated 2,4,7,9-tetramethyl-5-decyn-4,7-diol surfactants (commercially available from Evonik Corporation (Allentown, Pa.)), Stanfax (a sodium lauryl sulfate), Surfynol 465 (an ethoxylated 2,4,7,9-tetramethyl 5 decyn-4,7-diol), Triton™ GR-PG70 (1,4-bis(2-ethylhexyl) sodium sulfosuccinate), and Triton™ CF-10 (poly(oxy-1,2-ethanediyl), alpha-(phenylmethyl)-omega-(1,1,3,3-tetramethylbutyl) phenoxy).

The surfactant may be present in the binder composition in an amount from 0 to about 10% by weight, from about 0.1% to about 5.0% by weight, or from about 0.15% to about 2.0% by weight, or from about 0.2% to 1.0% by weight, based on the total solids content in the binder composition.

Optionally, the binder composition may contain a dust suppressing agent to reduce or eliminate the presence of inorganic and/or organic particles which may have adverse impact in the subsequent fabrication and installation of the insulation materials. The dust suppressing agent can be any conventional mineral oil, mineral oil emulsion, natural or synthetic oil, bio-based oil, or lubricant, such as, but not limited to, silicone and silicone emulsions, polyethylene glycol, as well as any petroleum or non-petroleum oil with a high flash point to minimize the evaporation of the oil inside the oven.

In any of the exemplary embodiments, the binder composition may include up to about 10 wt. % of a dust suppressing agent, including up to about 8 wt. %, or up to about 6 wt. %. In any of the exemplary embodiments, the binder composition may include between 0 wt. % and 10 wt. % of a dust suppressing agent, including about 1.0 wt. % to about 7.0 wt. %, or about 1.5 wt. % to about 6.5 wt. %, or about 2.0 wt. % to about 6.0 wt. %, or about 2.5 wt. % to 5.8 wt. %.

The binder composition further includes water to dissolve or disperse the active solids for application onto the reinforcement fibers. Water may be added in an amount sufficient to dilute the binder composition to a viscosity that is suitable for its application to the reinforcement fibers and to achieve a desired solids content on the fibers. It has been discovered that the present binder composition may contain a lower solids content than traditional phenol-urea formaldehyde or carbohydrate-based binder compositions. In particular, the binder composition may comprise 3% to 35% by weight of binder solids, including without limitation, 10% to 30%, 12% to 20%, and 15% to 19% by weight of binder solids.

The binder content on a product may be measured as loss on ignition (LOI). In any of the exemplary embodiments, the LOI on the glass fibers forming an insulation product may be 0.1% to 50%, including without limitation, 0.15% to 10%, 0.2% to 10%, and 0.3% to 5%.

In any of the exemplary embodiments, the binder composition may also include one or more additives, such as an extender, a crosslinking density enhancer, a deodorant, an antioxidant, a dust suppressing agent, a biocide, a moisture resistant agent, or combinations thereof. Optionally, the binder may comprise, without limitation, dyes, pigments, additional fillers, colorants, UV stabilizers, thermal stabilizers, anti-foaming agents, emulsifiers, preservatives (e.g., sodium benzoate), corrosion inhibitors, and mixtures thereof. Other additives may be added to the binder composition for the improvement of process and product performance. Such additives include lubricants, wetting agents, antistatic agents, and/or water repellent agents. Additives may be present in the binder composition from trace amounts (such as <about 0.1% by weight the binder composition) up to about 10% by weight of the total solids in the binder composition.

In any of the exemplary embodiments, the binder composition may be free or substantially free of a monomeric carboxylic acid component. Exemplary monomeric polycarboxylic acid components include aconitic acid, adipic acid, azelaic acid, butane tetra carboxylic acid dihydrate, butane tricarboxylic acid, chlorendic anhydride, citraconic acid, citric acid, dicyclopentadiene-maleic acid adducts, diethylenetriamine pentacetic acid pentasodium salt, adducts of dipentene and maleic anhydride, endomethylenehexachlorophthalic anhydride, fully maleated rosin, maleated tall oil fatty acids, fumaric acid, glutaric acid, isophthalic acid, itaconic acid, maleated rosin-oxidize unsaturation with potassium peroxide to alcohol then carboxylic acid, malic acid, maleic anhydride, mesaconic acid, oxalic acid, phthalic anhydride, polylactic acid, sebacic acid, succinic acid, tartaric acid, terephthalic acid, tetrabromophthalic anhydride, tetrachlorophthalic anhydride, tetrahydrophthalic anhydride, trimellitic anhydride, and trimesic acid.

In any of the exemplary embodiments, the binder composition includes at least one crosslinking agent, a protective agent, a polyol, and has a pH of at least 4. The range of components used in the inventive binder composition according to certain exemplary embodiments is set forth in Table 2. In embodiments where an alkanolamine is included as the polyol, the alkanolamine may also be considered as additional protective agent.

TABLE 2

| Component | Exemplary Range 1 (% By Weight of Total Solids) | Exemplary Range 2 (% By Weight of Total Solids) |
|---|---|---|
| Crosslinking Agent | 50-80 | 53-75 |
| Nitrogen-based Protective Agent | 1.25-40.0 | 2.0-25.0 |
| Polyol | 10-40* | 15-30 |
| COOH/Nitrogen Ratio | 4:1 | 1.5:1 |

The binder compositions disclosed herein may be used to manufacture insulation products, such as mineral wool insulation products. Thus, aspects of the present inventive concepts are also directed to a method for producing a mineral wool product and includes the steps of contacting mineral wool fibers with a binder composition as disclosed herein. The mineral wool product may comprise a facer on one or both of its major surfaces. The facer may be any type of facing substrate known in the art such as, for example, a nonwoven mat, a foil mat, a polymeric surfacing mat, a woven textile, and the like.

Figure 3:
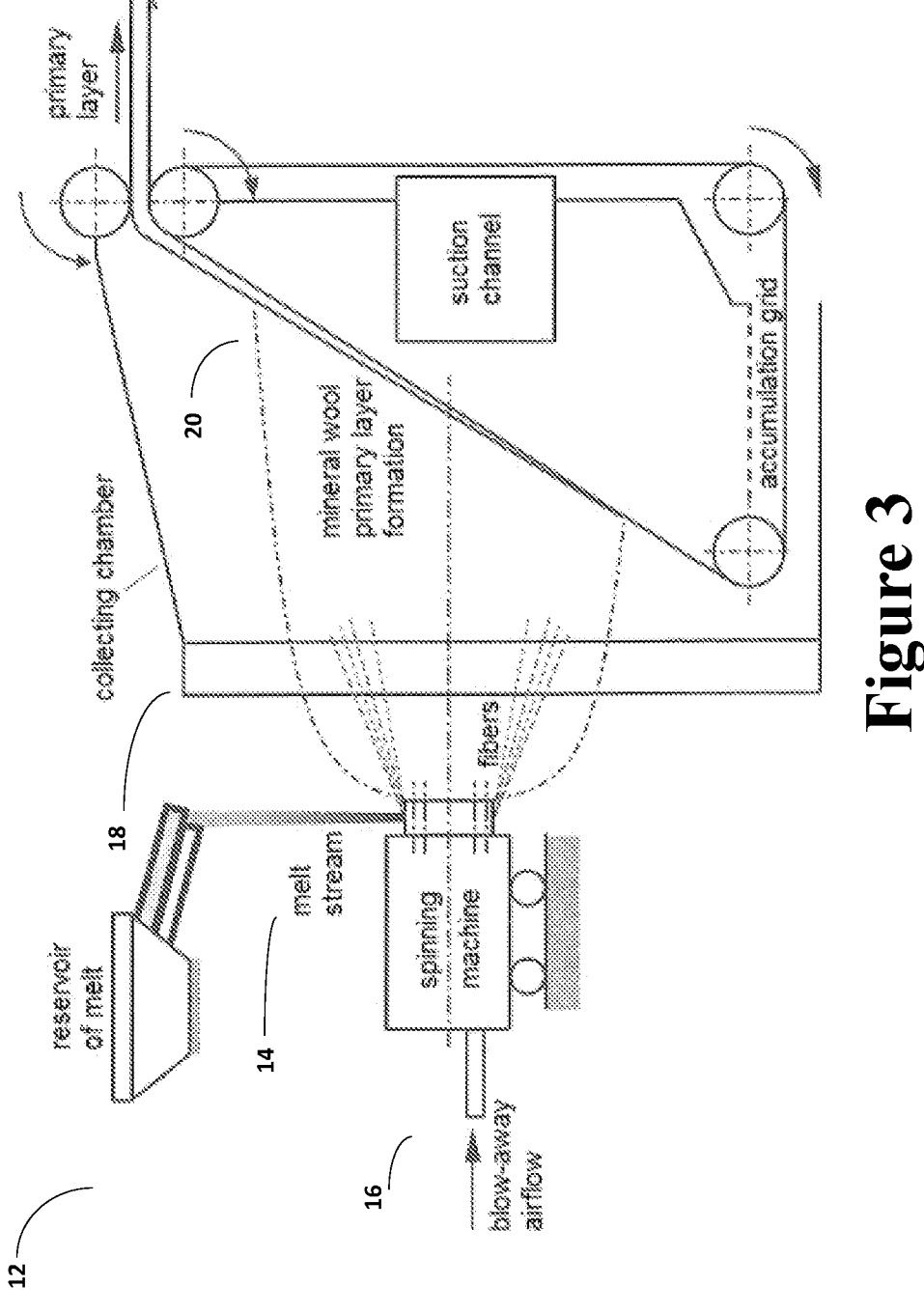
FIG. 3 illustrates an exemplary method for producing a mineral wool product according to the present invention.

An exemplary method for producing a mineral wool product according to the present invention is outlined in FIG. 3. A melt of raw mineral materials is prepared in a reservoir 12 and a melt stream 14 is descended into a spinning machine 16 (such as a centrifugal spinner), where the melt is fiberized and blown into a collection chamber 18, forming a mineral wool web on a collection belt 20. The binder composition may be applied to the mineral wool fibers before collection on the collection belt, as the fibers are being collected, or after the formation of the mineral wool web. The binder composition may be applied to the mineral wool fibers by known means, such as, for example, by spraying. The binder-coated mineral wool web is then heated in a conventional curing oven to cure the binder-coated mineral wool web, forming a mineral wool product. The mineral wool web may be subjected to compression to obtain a desired final product thickness.

Curing may be carried out in a curing oven at conventional temperatures, such as, for example from about 200° C. to about 400° C., such as from about 225° C. to about 350° C., and from about 230° C. to about 300° C.

The mineral wool insulation products produced in accordance with the present inventive concepts demonstrate improved properties compared to a mineral wool insulation product formed with an otherwise identical binder composition that does not include a protective agent. One such improved property includes tensile strength under hot humid conditions (65° C./95% relative humidity), both immediately upon manufacture and over an extended period of time. In any of the exemplary embodiments, the mineral wool insulation products according to the present inventive concepts may have a tensile strength of at least 30 kPa immediately upon manufacture and maintain at least 50% of the tensile strength after 7 days under hot/humid conditions, including at least 53% of the tensile strength, at least 55% of the tensile strength, at least 58% of the tensile strength, and at least 60% of the tensile strength. In any of the exemplary embodiments disclosed herein, the mineral wool insulation products according to the present inventive concepts may have a tensile strength between 35 kPa and 80 kPa immediately upon manufacture, including between 38 kPa and 75 kPa, and between 42 kPa and 70 kPa.

The mineral wool insulation products produced in accordance with the present inventive concepts further demonstrate improved compressive strength, compared to a mineral wool insulation product formed with an otherwise identical binder composition that does not include a protective agent. The compressive strength was measured and tested on a sample using a standard EN826 test method. The mineral wool insulation board products formed in accordance with the present inventive concepts demonstrate a compressive strength of at least 10 kPa, including at least 12 kPa, and at least 13 kPa.

Having generally described this invention, a further understanding can be obtained by reference to certain specific examples illustrated below which are provided for purposes of illustration only and are not intended to be all inclusive or limiting unless otherwise specified.

EXAMPLE 1

Various exemplary polyacrylic acid-based binder composition premixes were prepared in which the polyacrylic acid polymer was chain terminated by sodium hypophosphite to provide a number-average molecular weight between 2000 to 5000. A protective agent was then added to the polyacrylic acid polymer to form a binder premix. The binder premix was diluted with water, and various additives were included, as set forth below in Table 3, to produce the final binder composition. Each of the exemplary binder compositions are listed below:

TABLE 3

| Function | Ingredient | Composition | | | | | |
|---|---|---|---|---|---|---|---|
| | | EX. 1 | EX. 2 | EX. 3 | Comp. EX. 1 | Comp. EX. 2 | Comp. EX. 3 |
| Polyacid | Polyacrylic Acid | 63.92 | 51.01 | 56.44 | 70.29 | 74.26 | 68.77 |
| Protective Agent 1 | Ammonium Hydroxide | 8.44 | 6.73 | 11.29 | | | |
| Protect Agent 2 or polyol | Triethanolamine | 19.42 | 34.01 | | 21.35 | | |
| Polyol | Sorbitol | | | 24.19 | | | |
| Polyol | Pentaerythritol | | | | | 17.42 | 16.08 |
| pH Adjuster | Sodium Hydroxide | | | | | | 6.88 |
| Cure Accelerator | Sodium Hypophosphite | 1.28 | 1.30 | 1.13 | 1.41 | 1.38 | 1.27 |
| Surfactant | Surfynol 465 | 0.25 | 0.25 | 0.25 | 0.25 | 0.25 | 0.25 |
| Coupling Agent | Silane 989 | 1.00 | 1.00 | 1.00 | 1.00 | 1.00 | 1.00 |
| Dedusting Oil | Mineral Oil Emulsion | 5.70 | 5.70 | 5.70 | 5.70 | 5.70 | 5.70 |
| Protect Agent 1 to acid Normal Ratio | | 29.2 | 29.2 | 44.2 | | | |
| Protect Agent 2 to acid Normal Ratio | | 15.8 | 34.6 | | 15.8 | | |
| Total Protection to acid Normal ratio (%) | | 45.0 | 63.8 | 44.2 | 15.8 | 0 | 0 |

The above binder compositions were prepared and diluted to a solids concentration of about 12%. The binder compositions were applied to mineral wool via a typical mineral wool production line with a throughput of 4.5 tons/hour. Additional water was administrated through an injection system to minimize the fiber sticking to the collection conveyer. A primary mineral wool layer was cross-lapped with additional mineral wool layers to produce a product density of about 50 Kg/m³ before passing the mineral wool slab into the curing oven. The curing oven temperature was set to 250° C. to 300° C. The final mineral wool slab products were about 100 mm thick and had densities of about 55 Kg/m³.

The mineral wool slab products were collected and comprehensive standard testing was conducted. The results provided in Tables 3 and 4 exemplify the improved mineral wool product performance imparted by the inventive binder compositions comprising a protective agent, compared to the product properties imparted by similar acidic binder compositions, excluding such a protective agent. The test methods for each property is provided below.

Compressive Strength at 10% Strain: A standard EN826 test method was employed for the sample preparation and testing. The mineral wool slabs were 100 mm thick. The mineral wool slabs were placed centrally between the two plates of an Instron or equivalent compression testing instrument. The testing instrument was used to compress the specimen until a strain of 10% has been reached, providing a compressive stress at 10% strain. The compressive strength at 10% strain was calculated based upon the following equation:

$$\sigma_m = 103 \cdot F_m / A_0 \ [\text{kPa}]*$$

*$F_{10}$=Force corresponding to −10% deformation [N]
$F_m$=Maximum force [N]
$A_0$=Initial cross-section area [m2].

Swelling (%): A pressure cooker (alternatively an autoclave) is used to determine the swelling potential of the product. This treatment is a supplement to the behavior of the product that is stored in tropic box and can in shorter time indicate on problems with aging of the product. In the pressure cooker the product is stored 15 min at 0.8-1 bar pressure and 121° C. (autoclave 2.5 h at 2 bar and 134° C.). Swelling (%) is the net increase in volume after treatment in pressure cooker (alternatively autoclave).

Tensile Strength in Y-Direction (EN1607): Sample products in Y orientation were prepared having a dimension of 100 mm×100 mm and plywood plates were glued on both ends of the machines Y direction. The samples were attached to a tensile test jig and the maximum force was recorded as the tensile strength. The sample products were tested: 1) at end of the line (EOL), 2) after placement in a Tropic Box for 1 day, 3) for 7 days, and 4) for 28 days for aging and hot/humid conditioning before tensile testing. Conditions in the Tropic Box included a temperature of 65° C. and 95% relative humidity. The tensile retained percentage after 28 days in the Tropic Box is listed as Res % (Tensile after 28 days divided by tensile end of line).

As illustrated in Tables 4 and 5 below, the inclusion of a protective agent in an amount such that at least 40% of the COOH groups are protected provides significant impact on the product performance. Examples 1-3 each include at least 40% COONH₄ groups, indicating that at least 40% of the COOH groups are temporarily blocked with the nitrogen-based protective agent, and each example demonstrated compressive strengths of at least 12.0 kPa and less than 1% swelling. Additionally, each of Examples 1-3 retained over 20% tensile strength after 28 days in hot/humid conditions. Without the inclusion of a nitrogen-based protective agent, Comparative Examples 1-3 demonstrated 2.0% or higher swelling and lost significant tensile strength and in some instances broke after 28 days in hot/humid conditions. Furthermore, Comparative Example 3, which included pH adjustment with sodium hydroxide, demonstrated the highest occurrence of swelling (11.3%) and broke after only 1 day in hot/humid conditions. Thus, it is clear that traditional pH adjustment does not achieve the protective function that protective agent provides the subject binder composition.

TABLE 4

| Binder | Protected COONH4 (%) | Binder pH | Binder % | Comp. Strength (EN826) kPa | Swelling (%) |
|---|---|---|---|---|---|
| EX. 1 | 45.0 | 5.0 | 3.3 | 13.8 | 0.7 |
| EX. 2 | 63.8 | 5.7 | 1.9 | 12.2 | 0.7 |
| EX. 3 | 44.2 | 5.0 | 2.5 | 13.2 | 0.3 |
| Comp. EX. 1 | 15.8 | 4.0 | 3.3 | 13.5 | 2.0 |
| Comp. EX. 2 | 0.0 | 2.0 | 3.5 | 5.7 | 9.2 |
| Comp. EX. 3 | 0.0 | 4.0 | 3.0 | 8.6 | 11.3 |

TABLE 5

Tensile strength (kPa)(EN1607), Y (machine) -direction -Tropic Box

| Binder | EOL | 1D Tensile | 7D Tensile | 28D Tensile | Res. % |
|---|---|---|---|---|---|
| EX. 1 | 50.9 | 37.7 | 33.6 | 11.7 | 23.0 |
| EX. 2 | 39.8 | 25.7 | 29.8 | 11.1 | 27.9 |
| EX. 3 | 55.4 | 34.7 | 37.4 | 29.3 | 52.9 |
| Comp. EX. 1 | 40.4 | 27.0 | 21.5 | 2.2 | 5.4 |
| Comp. EX.2 | 11.6 | Broken | Broken | Broken | 0.0 |
| Comp. EX. 3 | 27.4 | Broken | Broken | Broken | 0.0 |

It will be appreciated that many more detailed aspects of the illustrated products and processes are in large measure, known in the art, and these aspects have been omitted for purposes of concisely presenting the general inventive concepts. Although the present invention has been described with reference to particular means, materials and embodiments, from the foregoing description, one skilled in the art can easily ascertain the essential characteristics of the present disclosure and various changes and modifications can be made to adapt the various uses and characteristics without departing from the spirit and scope of the present invention as described above and set forth in the attached claims.

The following paragraphs provide further exemplary embodiments.

Paragraph 1. A method of manufacturing an insulation product comprising;

collecting a plurality of inorganic fibers on a substrate, said inorganic fibers being formed of a composition comprising at least 25 wt. % of bi- and tri-valent metal oxides;

applying an aqueous binder composition to the collection of inorganic fibers, forming binder-coated inorganic fibers, the aqueous binder composition comprising:

at least 50 wt. % solids of a crosslinking agent comprising at least two carboxylic acid groups;

10.0 to 40.0 wt. % solids of a polyol component having at least two hydroxyl groups;

1.25-50.0 wt. % solids of a nitrogen-based protective agent, wherein said nitrogen-based protective agent comprises at least one of an amine-based protective agent or an ammonium based protective agent and temporarily blocks at least 40% the carboxylic acid groups of the crosslinking agent;

removing the nitrogen-based protective agent by heating the binder-coated inorganic fibers to a temperature of at least 150° C.; and curing the aqueous binder composition via an esterification reaction between the crosslinking agent and the polyhydroxy component, forming an inorganic fibrous insulation product, wherein said aqueous binder composition is free of added formaldehyde.

Paragraph 2. The method of paragraph 1, wherein the crosslinking agent is present in the binder composition in an amount between 55 wt. % and 85 wt. % solids, based on the total solids content of the aqueous binder composition.

Paragraph 3. The method of paragraph 1 or paragraph 2, wherein the polyol component comprises a sugar alcohol, an alkanolamine, pentaerythritol, or mixtures thereof.

Paragraph 4. The method of any one of paragraphs 1 to 3, wherein the nitrogen-based protective agent comprises ethylenediamine, ammonium hydroxide, or mixtures thereof.

Paragraph 5. The method of any one of paragraphs 1 to 4, wherein the aqueous binder composition has an uncured pH of 4.0 to 7.0.

Paragraph 6. The method of any one of paragraphs 1 to 5, wherein the aqueous binder composition has an uncured pH of 4.2 to 6.5.

Paragraph 7. The method of any one of paragraphs 1 to 6, wherein the insulation product has a tensile strength in the machine direction according to EN1607 of at least 30 kPa immediately upon manufacture.

Paragraph 8. The method of paragraph 7, wherein the insulation product maintains at least 50% of the tensile strength after 7 days in a tropic box with a temperature of 65° C. and 95% relative humidity.

Paragraph 9. The method of paragraph 7 or paragraph 8, wherein the insulation product maintains at least 60% of the tensile strength after 7 days in a tropic box with a temperature of 65° C. and 95% relative humidity.

Paragraph 10. The method of any one of paragraphs 1 to 9, wherein the insulation product has a compressive strength at 10% strain according to EN826 of at least 10 kPa.

Paragraph 11. A fibrous product comprising:

a plurality of randomly oriented mineral wool fibers; and an ester-crosslinked thermoset binder composition at least partially coating said fibers, wherein prior to crosslinking, the binder composition comprised an aqueous composition including the following components:

at least 50 wt. % solids of a crosslinking agent comprising at least two carboxylic acid groups;

10.0 to 40.0 wt. % solids of at least one polyol having at least two hydroxyl groups, based on the total solids content of the aqueous binder composition; and 1.25 to 50.0 wt. % solids of a nitrogen-based protective agent comprising at least one of an amine-based protective agent or an ammonium based protective agent;

prior to crosslinking, the nitrogen-based protective agent temporarily blocks at least 40% the carboxylic acid groups of the crosslinking agent;

wherein the mineral wool insulation product has a tensile strength in the machine direction according to EN1607 of at least 30 kPa immediately upon manufacture and maintains at least 50% of the tensile strength after 7 days under hot/humid conditions.

Paragraph 12. The fibrous product of paragraph 11, wherein said fibrous product comprises any of an insulation product, a non-woven mat, particle board, ceiling board, and duct board.

Paragraph 13. The fibrous product of paragraph 11 or paragraph 12, wherein the fibrous product maintains at least 60% of the tensile strength after 7 days in a tropic box with a temperature of 65° C. and 95% relative humidity.

Paragraph 14. The fibrous product of any one of paragraphs 11 to 13, wherein the crosslinking agent is present in the binder composition in an amount between 60 and 82 wt. %, based on the total solids content of the aqueous composition.

Paragraph 15. The fibrous product of any one of paragraphs 11 to 14, wherein the polyol component comprises a sugar alcohol, an alkanolamine, pentaerythritol, or mixtures thereof.

Paragraph 16. The fibrous product of any one of paragraphs 11 to 15, wherein said polyol component comprises sorbitol, triethanolamine, pentaerythritol, or mixtures thereof.

Paragraph 17. The fibrous product of any one of paragraphs 11 to 16, wherein the fibrous product has a compressive strength at 10% strain according to EN826 of at least 10 kPa.

Paragraph 18. An aqueous binder composition comprising:

at least 50 wt. % solids of a polymeric crosslinking agent comprising at least two carboxylic acid groups;

at least 8.0 wt. % solids of a nitrogen-based protective agent; and 10.0 to 35.0 wt. % solids of at least one polyol component having at least two hydroxyl groups; wherein the binder composition has a ratio of crosslinking agent to nitrogen-based protective agent from 4:1 to 1.5:1 and an uncured pH of at least 4.5, wherein prior to curing the binder composition, at least 40% of the carboxylic acid groups are temporarily blocked with the nitrogen-based protective agent.

Paragraph 19. The aqueous binder composition of paragraph 18, wherein the crosslinking agent is present in the aqueous binder composition in an amount between 60 and 82 wt. %, based on the total solids content of the aqueous binder composition.

Paragraph 20. The aqueous binder composition of paragraph 18 or paragraph 19, wherein the polyol component comprises one or more of a sugar alcohol, an alkanolamine, pentaerythritol, or mixtures thereof.

Paragraph 21. The aqueous binder composition of any one of paragraphs 18 to 20, wherein said polyol component comprises sorbitol, triethanolamine, pentaerythritol, or mixtures thereof.

Paragraph 22. The aqueous binder composition of any one of paragraphs 18 to 21, wherein the nitrogen-based protective agent is an amine-based protective agent or ammonium hydroxide.

What is claimed is:

1. A method of manufacturing an insulation product comprising;

collecting a plurality of inorganic fibers on a substrate, said inorganic fibers being formed of a composition comprising at least 25 wt. % of bi- and tri-valent metal oxides;

applying an aqueous binder composition to the collection of inorganic fibers, forming binder-coated inorganic fibers, the aqueous binder composition comprising:

from more than 50 wt. % to less or equal to 88.75 wt. % solids of a crosslinking agent comprising at least two carboxylic acid groups, wherein the crosslinking agent comprises polyacrylic acid;

from 10.0 to 40.0 wt. % solids of a polyol component having at least two hydroxyl groups;

from 1.25 to 40.0 wt. % solids of a nitrogen-based protective agent, wherein said nitrogen-based protective agent comprises at least one of an amine-based protective agent or an ammonium based protective agent and temporarily blocks at least 40% the carboxylic acid groups of the crosslinking agent;

removing the nitrogen-based protective agent by heating the binder-coated inorganic fibers to a temperature of at least 150° C.; and curing the aqueous binder composition via an esterification reaction between the crosslinking agent and the polyhydroxy component, forming an inorganic fibrous insulation product, wherein said aqueous binder composition is free of added formaldehyde.

2. The method of claim 1, wherein the crosslinking agent is present in the binder composition in an amount from 55 to 85 wt. % solids, based on the total solids content of the aqueous binder composition.

3. The method of claim 1, wherein the polyol component comprises a sugar alcohol, an alkanolamine, pentaerythritol, or mixtures thereof.

4. The method of claim 1, wherein the nitrogen-based protective agent comprises ethylenediamine, ammonium hydroxide, or mixtures thereof.

5. The method of claim 1, wherein the aqueous binder composition has an uncured pH of 4.0 to 7.0.

6. The method of claim 1, wherein the aqueous binder composition has an uncured pH of 4.2 to 6.5.

7. The method of claim 1, wherein the insulation product has a tensile strength in the machine direction according to EN1607 of at least 30 kPa immediately upon manufacture.

8. The method of claim 7, wherein the insulation product maintains at least 50% of the tensile strength after 7 days in a tropic box with a temperature of 65° C. and 95% relative humidity.

9. The method of claim 7, wherein the insulation product maintains at least 60% of the tensile strength after 7 days in a tropic box with a temperature of 65° C. and 95% relative humidity.

10. The method of claim 1, wherein the insulation product has a compressive strength at 10% strain according to EN826 of at least 10 kPa.

11. The method of claim 1, wherein the aqueous binder composition has a ratio of crosslinking agent to nitrogen-based protective agent of from 4:1 to 1.5:1.

* * * * *